United States Patent
Arnold et al.

(10) Patent No.: US 11,163,762 B2
(45) Date of Patent: Nov. 2, 2021

(54) MAPPING DOCUMENT DATA TO RELATIONAL DATA

(71) Applicant: International Business Machines Corporation, Armonk, NY (US)

(72) Inventors: Constantine Arnold, San Jose, CA (US); Lukas Rupprecht, San Jose, CA (US); Nitin Ramchandani, San Jose, CA (US); Tanveer F. Syeda-Mahmood, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 154 days.

(21) Appl. No.: 16/511,269

(22) Filed: Jul. 15, 2019

(65) Prior Publication Data
US 2021/0019310 A1    Jan. 21, 2021

(51) Int. Cl.
*G06F 16/2452* (2019.01)
*G06F 16/84* (2019.01)
*G06F 16/2453* (2019.01)
*G06F 16/2455* (2019.01)

(52) U.S. Cl.
CPC ...... *G06F 16/2452* (2019.01); *G06F 16/2455* (2019.01); *G06F 16/24534* (2019.01); *G06F 16/86* (2019.01)

(58) Field of Classification Search
CPC .............. G06F 16/2452; G06F 16/86; G06F 16/24534; G06F 16/2455
See application file for complete search history.

(56) References Cited

U.S. PATENT DOCUMENTS

| | | | |
|---|---|---|---|
| 6,009,422 A | 12/1999 | Ciccarelli | |
| 6,647,391 B1 | 11/2003 | Smith et al. | |
| 6,728,702 B1 | 4/2004 | Subramaniam et al. | |
| 7,444,321 B2 | 10/2008 | Cseri et al. | |
| 8,176,083 B2 | 5/2012 | Vossen et al. | |
| 9,336,327 B2 | 5/2016 | Melnik et al. | |
| 9,811,579 B1 | 11/2017 | Olson | |

(Continued)

OTHER PUBLICATIONS

Chasseur, Enabling JSON Document Stores in Relational Systems, pp. 1-6, Jun. 2013.*

(Continued)

*Primary Examiner* — Albert M Phillips, III
(74) *Attorney, Agent, or Firm* — Stephen R. Tkacs; William J. Stock

(57) ABSTRACT

A mechanism is provided in a data processing system to implement a data mapping engine for transparent and declarative translation of search queries on documents to queries on relational data. The data mapping engine receives a query from a search framework for a target database and translates the query to a target schema based on a mapping definition data structure to form a translated query. The mapping definition data structure declaratively maps between a source schema of the search framework to a target schema of a target database. The data mapping engine sends the translated query to the target database and receives a response from the target database. The data mapping engine translates the response to the source schema based on the mapping definition data structure to form a translated response and sends the translated response to the search framework.

19 Claims, 4 Drawing Sheets

(56) References Cited

U.S. PATENT DOCUMENTS

| | | |
|---|---|---|
| 2011/0289118 A1 | 11/2011 | Chen et al. |
| 2015/0278300 A1 | 10/2015 | Brette et al. |
| 2018/0137184 A1* | 5/2018 | Adamut ................ G06F 16/258 |
| 2020/0117737 A1* | 4/2020 | Gopakrishnan ........................... G06F 16/2455 |

OTHER PUBLICATIONS

Alooma Team, "ETL Tools: A Modern List", https://www.alooma.com/blog/etl-tools-modern-list, Accessed Apr. 10, 2019, 10 pages.

Fagin, Ronald et al., "Data Exchange: Semantics and Query Answering", In Theoretical Computer Science 336, May 2005, 36 pages.

Farber, Franz et al., "SAP HANA Database—Data Management for Modern Business Applications", SIGMOD Record, Dec. 2011 (vol. 40, No. 4), 7 pages.

Github, "Bazaarvoice/Jolt", https://github.com/bazaarvoice/jolt, Accessed on Apr. 10, 2019, 5 pages.

Github, "Stapdata Elassandra", https://github.com/strapdata/elassandra, Accessed on Jan. 27, 2020, 6 pages.

Krishnamurthy, Rajasekar et al., "XML views as integrity constraints and their use in query translation", 21st International Conference on Data Engineering (ICDE'05), Tokyo, Japan, Apr. 2005, 12 pages.

Krishnamurthy, Rajasekar et al., "XML-to-SQL Query Translation Literature: The State of the Art and Open Problems", First International XML Database Symposium, XSym 2003, Berlin, Germany, Sep. 8, 2003, 17 pages.

Melnik, Sergey et al., "Rondo: A Programming Platform for Generic Model Management", SIGMOD 2003, Jun. 9-12, 2003, San Diego, CA, 12 pages.

Papakonstantinou, Yannis et al., "A Query Translation Scheme for Rapid Implementation of Wrappers", Deductive and Object-Oriented Databases, Fourth International Conference, DOOD'95, Singapore, Dec. 4-7, 1995, Proceedings, 27 pages.

Popa, Lucian et al., "Translating Web Data", Proceedings of the 28th VLDB Conference, Hong Kong, China Aug. 2002, 12 pages.

Wang, Chengen et al., "Parameter mapping and data transformation for engineering application integration", Information Systems Frontiers. Dec. 2008, vol. 10 Issue 5, p. 589-600. 12 pages.

Yoshikawa, Masatoshi et al., "XRel: a path-based approach to storage and retrieval of XML documents using relational databases", ACM Trans. Internet Technol. 1, 1 (Aug. 2001), 32 pages.

* cited by examiner

FIG. 6

```
01  "PatientFeatureModel" : {
02    "tablename" : "PatientFeatureModel",
03    "fields" : {
04      "jsonModelName" : "PatientFeatureModel.jsonModelName,text",
05      "action" : "PatientFeatureModel.action,int",
06      "internalID" : "PatientFeatureModel.internalID,uuid",
07      "normalizedName" : "PatientFeatureModel.normalizedName,text",
08      "description" : "PatientFeatureModel.description,text",
09      "featurename" : "PatientFeatureModel.featurename,text",
10      "featureSrcPath" : "PatientFeatureModel.featuresrcpath,text",
11      "featureURL" : "PatientFeatureModel.featureurl,text",
12      "featureExtID" : "PatientFeatureModel.featureextid,text",
13      "processDate" : "PatientFeatureModel.processdate,timestamp",
14      "dateRecorded" : "PatientFeatureModel.recordeddate,timestamp",
15      "vistype" : "PatientFeatureModel.vistype,text",
16      "zoneID,pkey" : "PatientFeatureModel.zoneid,text",
17      "studyID,skeys/com.ibm.medsieve.alprmodels.patientspecific.PatientStudyModel.encounterID",
18      "PatientFeatureModel.encounterid.text",
19      "examID,skeys/com.ibm.medsieve.alprmodels.patientspecific.PatientExamDataModel.fillerOrder":
20      "PatientFeatureModel.orderDetails,text",
21      "featuredesc" : "PatientFeatureModel.featuredesc,List<UDT<ClinicalFeatureModel>>",
22      "featuredesc.name" : "PatientFeatureModel.featuredesc.name,text",
23      "featuredesc.conceptype" : "PatientFeatureModel.featuredesc.conceptype,UDT<KnowledgeModel>",
24      "featuredesc.conceptype.automaticallyDerived" : "PatientFeatureModel.featuredesc.conceptype.automaticallyDerived,boolean",
25      "featuredesc.conceptype.description" : "PatientFeatureModel.featuredesc.conceptype.description,text",
26      ....
27      "patientMRN,select patient_id from \"lookup\" where patient_interval_id = \"?\"" :
28      "PatientFeatureModel,patientInternalID,UUID,select patient_internal_id from \"lookup\" where patient_id LIKE \"%?%\""
29    }
30  }
```

MAPPING DOCUMENT DATA TO RELATIONAL DATA

BACKGROUND

The present application relates generally to an improved data processing apparatus and method and more specifically to mechanisms for mapping document data to relational data.

An electronic health record (EHR) or electronic medical record (EMR) is the systematized collection of patient and population electronically-stored health information in a digital format. These records can be shared across different health care settings. Records are shared through network-connected, enterprise-wide information systems or other information networks and exchanges. EMRs may include a range of data, including demographics, medical history, medication and allergies, immunization status, laboratory test results, radiology images, vital signs, personal statistics like age and weight, and billing information.

EMR systems are designed to store data accurately and to capture the state of a patient across time. It eliminates the need to track down a patient's previous paper medical records and assists in ensuring data is accurate and legible. It can reduce risk of data replication as there is only one modifiable file, which means the file is more likely up to date, and decreases risk of lost paperwork. Due to the digital information being searchable and in a single file, EMRs are more effective when extracting medical data for the examination of possible trends and long term changes in a patient. Population-based studies of medical records may also be facilitated by the widespread adoption of EMRs.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions that are executed by the processor to specifically configure the processor to implement a data mapping engine for transparent and declarative translation of search queries on documents to queries on relational data. The method comprises receiving query from a search framework for a source document database and translating the query to a target schema based on a mapping definition data structure to form a translated query. The mapping definition data structure declaratively maps between a source schema of the search framework to a target schema of a target database. The method further comprises sending the translated query to the target database and receiving a response from the target database. The method further comprises translating the response to the source schema based on the mapping definition data structure to form a translated response and sending the translated response to the search framework.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 illustrates an example mapping definition data structure in accordance with an exemplary embodiment.

DETAILED DESCRIPTION

Figure 1:
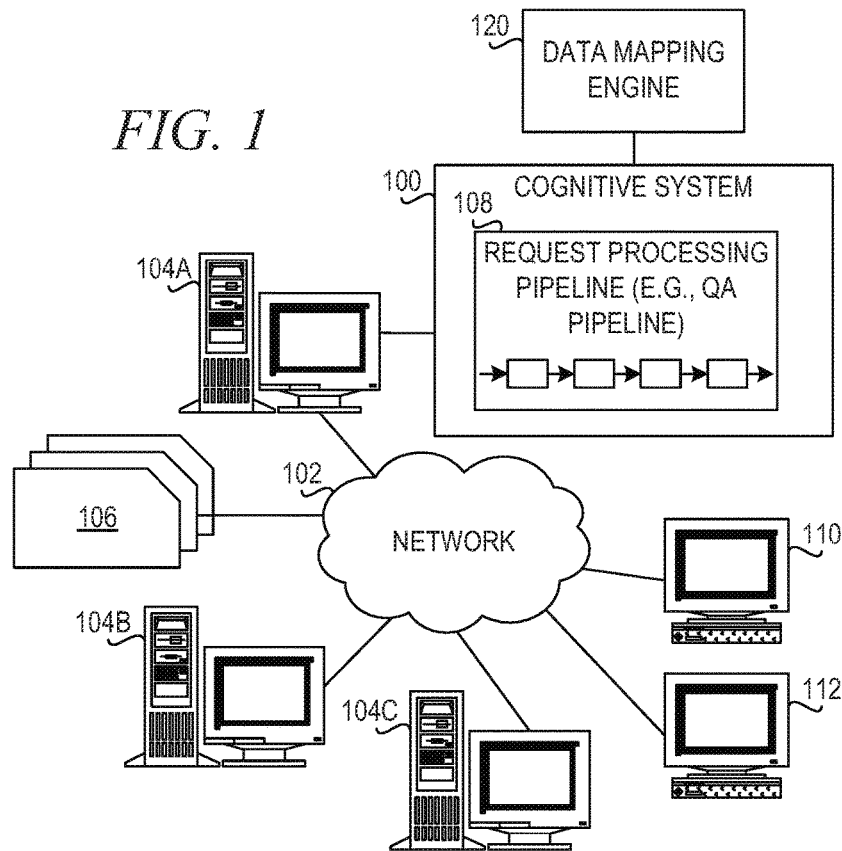
FIG. 1 depicts a schematic diagram of one illustrative embodiment of a cognitive healthcare system in a computer network.

A healthcare cognitive system platform may use a search framework to search through indexed records of patient data. To ensure that analytical modules of the healthcare cognitive system platform perform efficiently, advanced search features are provided by the search framework.

For example, the Apache Lucene® search engine library is an open-source, full-text search engine software library. The Apache Lucene® search engine library uses an inverted indexing of data—instead of mapping pages to keywords, it maps keywords to pages just like a glossary at the end of any book. This allows for faster search responses, as it searches through an index instead of searching through text directly. In this context, a document is a collection of fields, and each field has a value associated with it. Indices are typically made up of one or more documents, and search results are sets of best-matching documents. Documents can have field data, where a field is typically a key holding a data value. An analysis is converting the given text into smaller and precise units for easy the sake of searching. The Apache Lucene® search engine library provides a very dynamic and easy to write query syntax including range searches, wildcards, fuzzy matches, etc.

Patient data may be stored in a relational database, such as a NoSQL database. For example, the Apache Cassandra® database is an open-source, distributed, wide column store, NoSQL database management system designed to handle large amounts of data across many commodity servers, providing high availability and scalability with no single point of failure. The Apache Cassandra® database offers robust support for clusters spanning multiple datacenters, with asynchronous master-less replication allowing low latency operations for all clients. It is not possible to do query a NoSQL database with advanced search features of a document store as described above. Moreover, one cannot apply existing document-based search queries in the advanced search framework to a NoSQL database.

A NoSQL (originally referring to non-structured query language (SQL)) database provides a mechanism for storage and retrieval of data that is modeled in means other than the tabular relations used in relational databases. NoSQL databases are increasingly used in big data and real-time web applications. NoSQL systems are also sometimes called "Not only SQL" to emphasize that they may support SQL-like query languages, or sit alongside SQL database in a polyglot persistence architecture. The data structures used by NoSQL databases (e.g., key-value, wide column, graph, or document) are different from those used by default in relational databases, making some operations faster in NoSQL. The particular suitability of a given NoSQL database depends on the problem it must solve. Sometimes the data structures used by NoSQL databases are also viewed as more flexible than relational database tables.

Many NoSQL stores compromise consistency (in the sense of the CAP theorem) in favor of availability, partition tolerance, and speed. Barriers to the greater adoption of NoSQL stores include the use of low-level query languages (instead of SQL, for instance the lack of ability to perform ad-hoc joins across tables), lack of standardized interfaces, and huge previous investments in existing relational databases. Most NoSQL stores lack true Atomicity, Consistency, Isolation, Durability (ACID) transactions, although a few databases have made them central to their designs. In general, NoSQL databases are not relational. However, the Apache Cassandra® database uses a relational data model. While the Apache Cassandra® database is a key-value store, data is still modeled as tables and queries formulated based on those tables.

The illustrative embodiments address the problem of applying document-based search queries on a relational database by transforming document queries to relational queries. The illustrative embodiments provide a transformation layer that enables document searches from existing tools on relational data, independent of the source and target schemas. For example, the transformation layer may map Apache Lucene® search engine documents to Apache Cassandra® tables and translate Apache Lucene® search engine queries to Apache Cassandra® query language queries. The transformation layer also supports search with result ranking on relational data. The illustrative embodiment also develops a declarative language to define mapping between source and target schemas and provides a mapping definition that issued by a query translator component to translate incoming queries to the target schema. The declarative language provides constructs for advanced mappings such as programmatic transformations or source data parsing. The language does not provide programmable extensions to keep it declarative in nature and to simplify its usage.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of" and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine" or "service," if used herein with regard to describing embodiments and features of the invention, is not intended to be limiting of any particular implementation for accomplishing and/or performing the actions, steps, processes, etc., attributable to and/or performed by the engine or service. An engine or service may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine or service is, unless otherwise specified, for purposes of convenience of reference and not intended to be limiting to a specific implementation. Additionally, any functionality attributed to an engine or service may be equally performed by multiple engines, incorporated into and/or combined with the functionality of another engine of the same or different type, or distributed across one or more engines or services of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
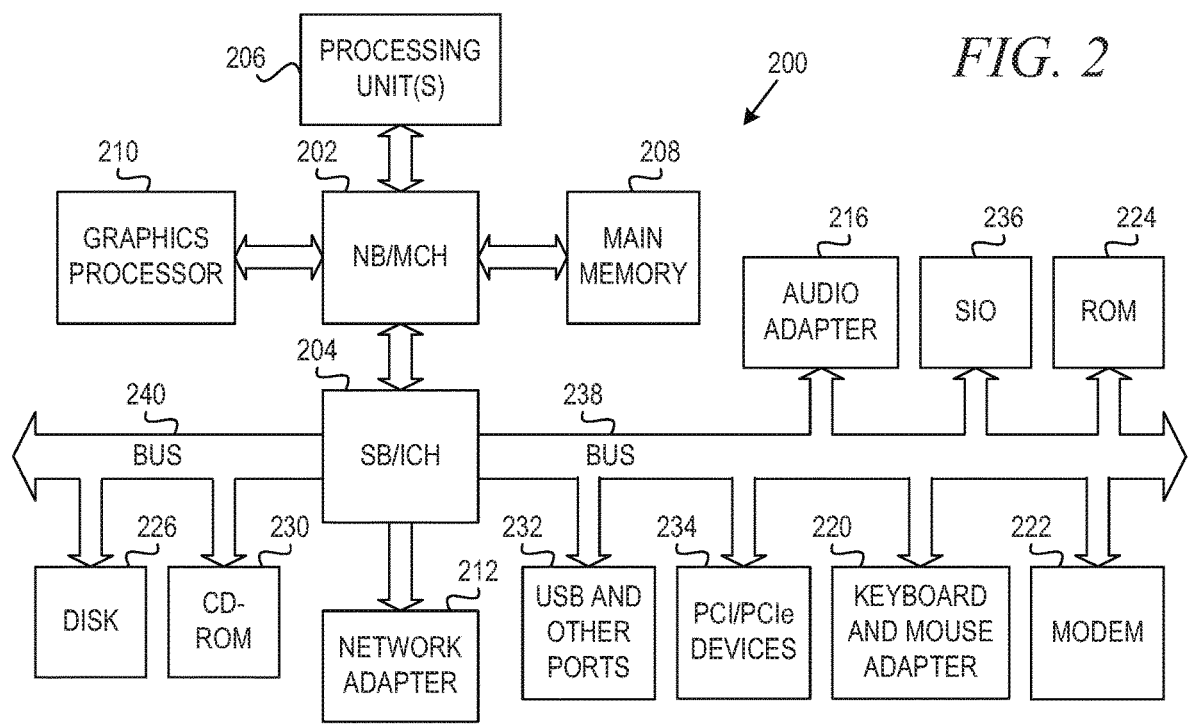
FIG. 2 is a block diagram of an example data processing system in which aspects of the illustrative embodiments are implemented.
Figure 3:
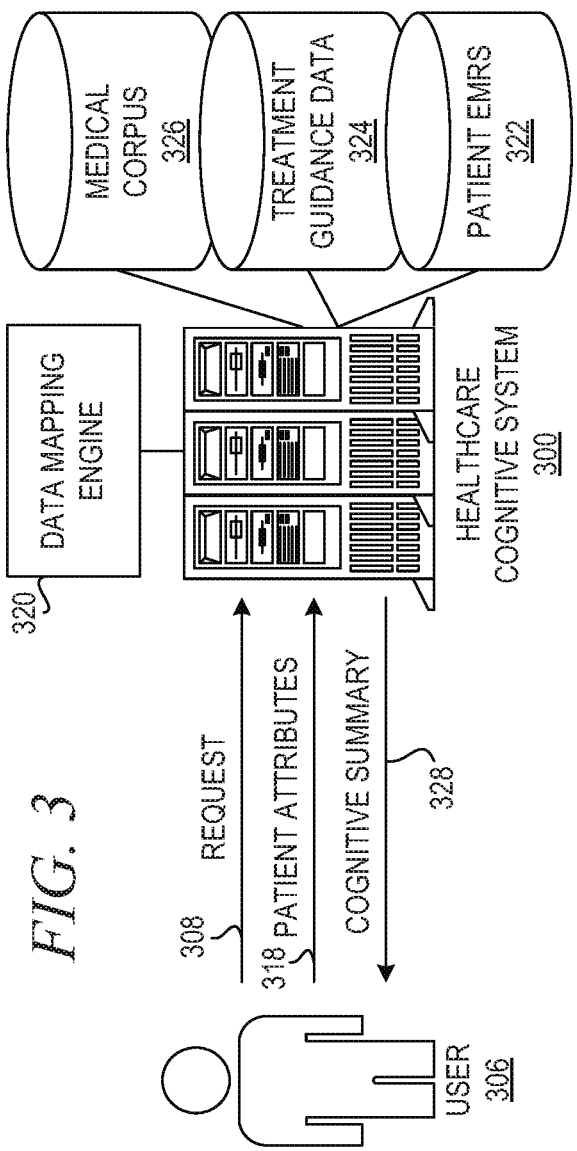
FIG. 3 is an example diagram illustrating an interaction of elements of a healthcare cognitive system in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for healthcare applications (also referred to herein as a "healthcare cognitive system") which implements a request processing pipeline, request processing methodology, and request processing computer program product with which the mechanisms of the illustrative embodiments are implemented. These requests may be provided as structured or unstructured request messages or any other suitable format for requesting an operation to be performed by the healthcare cognitive system. As described in more detail hereafter, the particular healthcare application that is implemented in the cognitive system of the present invention is a healthcare application for cognitive analysis and disambiguation of electronic medical records for presentation of pertinent information for a medical treatment plan.

It should be appreciated that the healthcare cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a first medical malady domain (e.g., various types of blood diseases) while another request processing pipeline may be trained to answer input requests in another medical malady domain (e.g., various types of cancers). In other cases, for example, the request processing pipelines may be configured to provide different types of cognitive functions or support different types of healthcare applications, such as one request processing pipeline being used for patient diagnosis, another request processing pipeline being configured for cognitive analysis of EMR data, another request processing pipeline being configured for patient monitoring, etc.

Moreover, each request processing pipeline may have its own associated corpus or corpora that it ingests and operate on, e.g., one corpus for blood disease domain documents and another corpus for cancer diagnostics domain related documents in the above examples. In some cases, the request processing pipelines may each operate on the same domain of input requests but may have different configurations, e.g., different annotators or differently trained annotators, such that different analysis and potential answers are generated. The healthcare cognitive system may provide additional logic for routing input requests to the appropriate request processing pipeline, such as based on a determined domain of the input request, combining and evaluating final results generated by the processing performed by multiple request processing pipelines, and other control and interaction logic that facilitates the utilization of multiple request processing pipelines.

As will be discussed in greater detail hereafter, the illustrative embodiments may be integrated in, augment, and extend the functionality of the request processing pipeline and mechanisms of a healthcare cognitive system with regard to mapping document data to relational data.

Thus, it is important to first have an understanding of how cognitive systems in a cognitive system implementing a request processing pipeline is implemented before describing how the mechanisms of the illustrative embodiments are integrated in and augment such cognitive systems and request processing pipeline mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

FIG. 1 depicts a schematic diagram of one illustrative embodiment of a cognitive system 100 implementing a request processing pipeline 108 in a computer network 102. The cognitive system 100 is implemented on one or more computing devices 104A-C (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-C. The network 102 includes multiple computing devices 104A-C, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 may provide cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language request, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-C on the network 102 include access points for content creators and cognitive system users. Some of the computing devices 104A-C include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input requests to the cognitive system 100 that are processed based on the content in the corpus or corpora of data 106. In one embodiment, the requests are formed using natural language. The cognitive system 100 parses and interprets the request via a pipeline 108, and provides a response to the cognitive system user, e.g., cognitive system user 110, containing one or more response to the request, results of processing the request, or the like. In some embodiments, the cognitive system 100 provides a response to users in a ranked list of candidate responses while in other illustrative embodiments, the cognitive system 100 provides a single final response or a combination of a final response and ranked listing of other candidate responses.

The cognitive system 100 implements the pipeline 108 which comprises a plurality of stages for processing an input request based on information obtained from the corpus or corpora of data 106. The pipeline 108 generates responses for the input request based on the processing of the input request and the corpus or corpora of data 106.

As noted above, while the input to the cognitive system 100 from a client device may be posed in the form of a natural language request, the illustrative embodiments are not limited to such. Rather, the input request may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In the case of a healthcare based cognitive system, this analysis may involve processing patient medical records, medical guidance documentation from one or more corpora, and the like, to provide a healthcare oriented cognitive system result.

In the context of the present invention, cognitive system 100 may provide a cognitive functionality for assisting with healthcare based operations. For example, depending upon the particular implementation, the healthcare based operations may comprise patient diagnostics medical practice management systems, personal patient care plan generation and monitoring, or patient electronic medical record (EMR) evaluation for various purposes. Thus, the cognitive system 100 may be a healthcare cognitive system 100 that operates in the medical or healthcare type domains and which may process requests for such healthcare operations via the request processing pipeline 108 input as either structured or unstructured requests, natural language input, or the like.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a data mapping engine 120 that enables document searches from existing tools on relational data, independent of the source and target schemas. In one example embodiment, data mapping engine 120 maps Apache Lucene® search engine documents to Apache Cassandra® database tables and translates Apache Lucene® search engine Boolean queries to Apache Cassandra® query language (CQL) queries.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including North Bridge and Memory Controller Hub (NB/MCH) 202 and South Bridge and Input/Output (I/O) Controller Hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is an example diagram illustrating an interaction of elements of a healthcare cognitive system in accordance with one illustrative embodiment. The example diagram of FIG. 3 depicts an implementation of a healthcare cognitive system 300 that is configured to provide a cognitive summary of EMR data for patients, to accurately identify the seriousness of an adverse event, and to evaluate the expectedness of an adverse event due to a drug taken by a patient. However, it should be appreciated that this is only an example implementation and other healthcare operations may be implemented in other embodiments of the healthcare cognitive system 300 without departing from the spirit and scope of the present invention.

Moreover, it should be appreciated that while FIG. 3 depicts the user 306 as a human figure, the interactions with user 306 may be performed using computing devices, medical equipment, and/or the like, such that user 306 may in fact be a computing device, e.g., a client computing device. For example, interactions between the user 306 and the healthcare cognitive system 300 will be electronic via a user computing device (not shown), such as a client computing device 110 or 112 in FIG. 1, communicating with the healthcare cognitive system 300 via one or more data communication links and potentially one or more data networks.

As shown in FIG. 3, in accordance with one illustrative embodiment, the user 306 submits a request 308 to the healthcare cognitive system 300, such as via a user interface on a client computing device that is configured to allow users to submit requests to the healthcare cognitive system 300 in a format that the healthcare cognitive system 300 can parse and process. The request 308 may include, or be accompanied with, information identifying patient attributes 318. These patient attributes 318 may include, for example, an identifier of the patient 302 from which patient EMRs 322 for the patient may be retrieved, demographic information about the patient, symptoms, and other pertinent information obtained from responses to requests or information obtained from medical equipment used to monitor or gather data about the condition of the patient. Any information about the patient that may be relevant to a cognitive evaluation of the patient by the healthcare cognitive system 300 may be included in the request 308 and/or patient attributes 318.

The healthcare cognitive system 300 provides a cognitive system that is specifically configured to perform an implementation specific healthcare oriented cognitive operation. In the depicted example, this healthcare oriented cognitive operation is directed to providing a cognitive summary of EMR data 328 to the user 306 to assist the user 306 in treating the patient based on their reported symptoms and other information gathered about the patient. The healthcare cognitive system 300 operates on the request 308 and patient attributes 318 utilizing information gathered from the medical corpus 326, treatment guidance data 324, and the patient EMRs 322 associated with the patient to generate cognitive summary 328. The cognitive summary 328 may be presented in a ranked ordering with associated supporting evidence, obtained from the patient attributes 318 and data sources 322-326, indicating the reasoning as to why portions of EMR data 322 are being provided.

In accordance with the illustrative embodiments herein, the healthcare cognitive system 300 is augmented to include a data mapping engine 320 that enables document searches from existing tools on relational data, independent of the source and target schemas.

Figure 4:
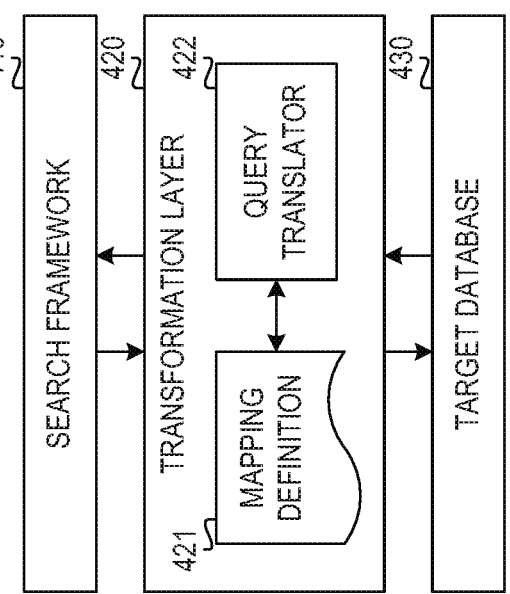
FIG. 4 is a block diagram of a data mapping engine in accordance with an illustrative embodiment.

FIG. 4 is a block diagram of a data mapping engine in accordance with an illustrative embodiment. Search framework 410 is a set of advanced search tools used by healthcare cognitive system 300. In one example embodiment, search framework 410 may use the Apache Lucene® search engine library. The cognitive system uses search framework 410 to access patient data in target database 430. In one example embodiment, target database 430 is the patient EMRs 322 in FIG. 3. In accordance with the illustrative embodiment, target database 430 is a relational database. In one example embodiment, target database 430 uses Apache Cassandra® database software.

Transformation layer 420 maps documents in the search framework 410 to tables in target database 430. Transformation layer 420 also translates queries from search framework 410 to the schema of target database 430. The illustrative embodiment provides a declarative language to define mapping between source and target schemas. Query translator component 422 uses mapping definition data structure 421 to translate incoming queries to the target schema of target database 430. The declarative language provides constructs for advanced mappings, such as programmatic transformations or source data parsing. The declarative language does not provide programmable extensions to keep it declarative in nature and to simplify its usage.

Figure 5:
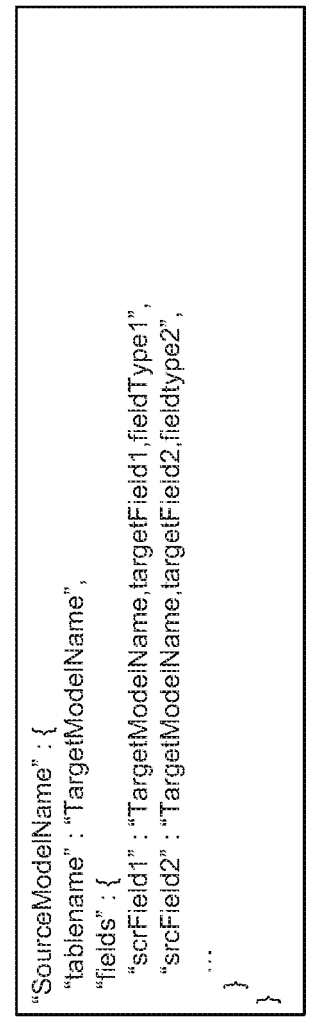
FIG. 5 illustrates the main structure of a mapping definition in accordance with an illustrative embodiment.

In one embodiment, mapping definition 421 is defined in JavaScript Object Notation (JSON) format to be easily processed by humans and machines. FIG. 5 illustrates the main structure of a mapping definition in accordance with an illustrative embodiment. The mapping definition indicates a source model name and maps a table name to a target model name. The mapping definition in FIG. 5 also maps one or more fields by mapping a source field name to a target model name, a target field name, and a field type. The mapping definition 421 supports for nested fields on both sides using dot-notation. The mapping definition 421 also provides several advanced features, such as the following:

Mapping of specific array values to target values using "/": "array/key": "TargetModelName,targetField,type"

Mapping to multiple target models using "+": "src field": "Target1+Target2,field1+field2,type1+type2"

Indirect mapping via queries on target schema: "srcField, select a from R where b=?": "TargetModelName,targetField, type,select b from R where a=?"

Indirect mappings are cached to improve performance and reduce the number of additional lookup queries required.

The mapping is used to translate field names and their corresponding values in the clauses of incoming queries to the correct names/values in the query against the target schema. Incoming queries are parsed recursively and their individual clauses are detected and translated. Exact matches are translated to an equality clause (WHERE a=b). Prefix/infix/suffix matches are translated to a like clause (WHERE a LIKE % b %). Range searches are translated to range clauses (WHERE a>=b AND a<=c).

The target query is only limited by the query capabilities of the target database 430. To remove limitations an additional query processor (e.g., Apache Spark™ software) can be put on top of the target system. This allows implementation of more complex queries, such as fuzzy matches, that are not straightforwardly supported in a key-value store. Custom ranking functions can be applied to the query results to only return the best matches. The generic mapping makes the query transformation transparent for existing/legacy applications.

FIG. 6 illustrates an example mapping definition data structure in accordance with an exemplary embodiment. The mapping of array elements is demonstrated in lines 17-18 and 19-20. The feature uses a slash notation to describe the mapping field (examID.skeys), which is an array with named entries, and the specific element of the array that should be mapped, separated by a slash.

Lines 27-28 show an example for an indirect mapping. Besides the mapping field (patientMRN), the mapping also contains a translation query, to correctly look up the target value to which the original patientMRN should be mapped. The '?' is a placeholder, which is filled with the patientMRN of the current record at the time the mapping is computed. It is possible to form chains of queries, i.e., to add a second, a third, etc., query and use the output of previous queries as input to the following queries, to achieve more complex mappings. A query also exists for the reverse mapping to translate values back to the correct value in the source schema. Returning to FIG. 4, transformation layer 420 also translates results from target database 430 to document-based results usable by search framework 410.

Figure 7:
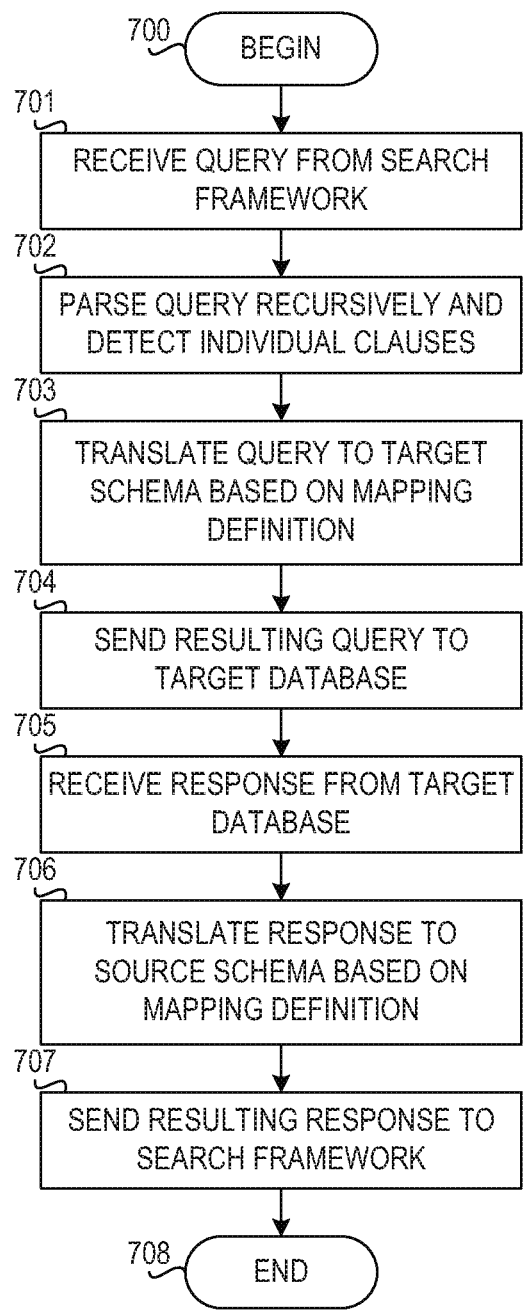
FIG. 7 is a flowchart illustrating operation of a data mapping engine in accordance with an illustrative embodiment.

FIG. 7 is a flowchart illustrating operation of a data mapping engine in accordance with an illustrative embodiment. Operation begins (block 700), and the data mapping engine receives a query from the search framework (block 701). The data mapping engine parses the query recursively and detects individual clauses (block 702). The data mapping engine translates the query to the target schema based on a mapping definition (block 703). In an example embodiment, the mapping definition is in a declarative, JSON-based language.

The data mapping engine sends the resulting query to the target database (block 704) and receives a response from the target database (block 705). The data mapping engine then translates the response to the source schema based on the mapping definition (block 706). The data mapping engine sends the resulting response to the search framework (block 707). Thereafter, operation ends (block 708).

Thus, the illustrative embodiments provide a data mapping engine for transparently and declaratively translating search queries on documents to queries on relational data. The illustrative embodiments provide a mapping definition data structure in a declarative, JSON-based language to define mapping. The mapping definition may include notation to support mappings to multiple target models. The mapping definition may also include notation to support indirect mappings. The data mapping engine also enables translation of search query concepts (e.g., range, prefix, fuzzy) to SQLMapReduce-style queries. Generic mapping can also be used for model transformation of existing data (i.e., read data from source and load into target).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement a data mapping engine for transparent and declarative translation of search queries on documents to queries on relational data, wherein the method comprises:
    receiving a query from a search framework for a target database;
    translating, by the data mapping engine, the query to a target schema based on a mapping definition data structure to form a translated query, wherein the mapping definition data structure declaratively maps between a source schema of the search framework to a target schema of a target database, wherein the mapping definition data structure maps a field indirectly via a query on the target schema and wherein the query on the target schema is cached;
    sending the translated query to the target database;
    receiving a response from the target database;
    translating, by the data mapping engine, the response to the source schema based on the mapping definition data structure to form a translated response; and
    sending the translated response to the search framework.

2. The method of claim 1, wherein the mapping definition data structure maps a table name to a target model name.

3. The method of claim 1, wherein the mapping definition data structure maps at least one field to a target model name, a target field, and a field type.

4. The method of claim 1, wherein the mapping definition data structure maps array values to target fields.

5. The method of claim 1, wherein the snapping definition data structure maps a field to multiple target models.

6. The method of claim 1, wherein the data mapping engine translates exact matches to an equality clause.

7. The method of claim 1, wherein the mapping engine translates prefix, infix, or suffix matches to a like clause.

8. The method of claim 1, wherein the mapping definition engine translates range searches to range clauses.

9. The method of claim 1, wherein the mapping definition data structure maps a table name to a target model name, maps at least one field to a target model name, a target field, and a field type, maps array values to target fields, and maps a field to multiple target models; and wherein the mapping engine translates prefix, infix, or suffix matches to a like clause and translates range searches to range clauses.

10. A computer program product comprising a computer readable storage medium having a computer readable program stored therein, wherein the computer readable program, when executed on a computing device, causes the computing device to implement a data mapping engine for transparent and declarative translation of search queries on documents to queries on relational data, wherein the computer readable program causes the computing device to:
    receive a query from a search framework for a target database;
    translate, by the data mapping engine, the query to a target schema based on a mapping definition data structure to form a translated query, wherein the mapping definition data structure declaratively maps between a source schema of the search framework to a target schema of a target database, wherein the mapping definition data structure maps a field indirectly via a query on the target schema and wherein the query on the target schema is cached;
    send the translated query to the target database;
    receive a response from the target database;
    translate, by the data mapping engine, the response to the source schema based on the mapping definition data structure to form a translated response; and
    send the translated response to the search framework.

11. The computer program product of claim 10, wherein the mapping definition data structure maps a table name to a target model name.

12. The computer program product of claim 10, wherein the mapping definition data structure maps at least one field to a target model name, a target field, and a field type.

13. The computer program product of claim 10, wherein the mapping definition data structure maps array values to target fields.

14. The computer program product of claim 10, wherein the mapping definition data structure maps a field to multiple target models.

15. The computer program product of claim 10, wherein the data mapping engine translates exact matches to an equality clause.

16. The computer program product of claim 10, wherein the engine translates range searches to range clauses.

17. The computer program product of claim 10, wherein the mapping definition data structure maps a table name to a target model name, maps at least one field to a target model name, a target field, and a field type, maps array values to target fields, and maps a field to multiple target models; and wherein the mapping engine translates prefix, infix, or suffix matches to a like clause and translates range searches to range clauses.

18. An apparatus comprising:
    a processor; and
    a memory coupled to the processor, wherein the memory comprises instructions which, when executed by the processor, cause the processor to implement a data mapping engine for transparent and declarative translation of search queries on documents to queries on relational data, wherein the instructions cause the processor to:
    receive a query from a search framework for a target database;
    translate, by the data mapping engine, the query to a target schema based on a mapping definition data structure to form a translated query, wherein the mapping definition data structure declaratively maps between a source schema of the search framework to a target schema of a target database, wherein the mapping definition data structure maps a field indirectly via a query on the target schema and wherein the query on the target schema is cached;
send the translated query to the target database;
receive a response from the target database;
translate, by the data mapping engine, the response to the source schema based on the mapping definition data structure to form a translated response; and
send the translated response to the search framework.

19. The apparatus of claim 18, wherein the mapping definition data structure maps a table name to a target model name, maps at least one field to a target model name, a target field, and a field type, maps array values to target fields, and maps a field to multiple target models; and wherein the mapping engine translates prefix, infix, or suffix matches to a like clause and translates range searches to range clauses.

* * * * *